US012558910B1

(12) United States Patent
Shih

(10) Patent No.: US 12,558,910 B1
(45) Date of Patent: Feb. 24, 2026

(54) STAMP HANDLE HAVING TRANSPARENT HOUSING

(71) Applicant: SUN SAME ENTERPRISES CO., LTD., Tainan City (TW)

(72) Inventor: Wen Jer Shih, Tainan City (TW)

(73) Assignee: SUN SAME ENTERPRISES CO., LTD., Tainan City (TW)

( * ) Notice: Subject to any disclaimer, the term of this patent is extended or adjusted under 35 U.S.C. 154(b) by 0 days.

(21) Appl. No.: 18/925,009

(22) Filed: Oct. 23, 2024

(51) Int. Cl.
*B41K 1/56* (2006.01)

(52) U.S. Cl.
CPC ...................................... *B41K 1/56* (2013.01)

(58) Field of Classification Search
None
See application file for complete search history.

(56) References Cited

U.S. PATENT DOCUMENTS

| | | | | |
|---|---|---|---|---|
| 5,909,709 | A | 6/1999 | An et al. | |
| 6,112,662 | A | 9/2000 | Okumura et al. | |
| 6,994,025 | B1 * | 2/2006 | Faber | B41K 1/40 101/104 |
| 2005/0066828 | A1 * | 3/2005 | Wei | B41K 1/40 101/333 |
| 2007/0169650 | A1 | 7/2007 | Shih | |
| 2015/0352876 | A1 | 12/2015 | Faber | |
| 2016/0325573 | A1 | 11/2016 | Mitsuya et al. | |
| 2018/0086124 | A1 | 3/2018 | Mitsuya | |
| 2020/0039268 | A1 | 2/2020 | Marx et al. | |

FOREIGN PATENT DOCUMENTS

| | | | |
|---|---|---|---|
| CN | 213228058 | U | 5/2021 |
| DE | 1136720 | B | 9/1962 |
| JP | S60102953 | U | 7/1985 |
| JP | 3102615 | U | 4/2004 |
| JP | 2007152931 | A1 | 6/2007 |
| JP | 3136967 | U | 10/2007 |
| KR | 940020418 | | 9/1994 |
| KR | 20070031637 | A | 3/2007 |
| KR | 102276468 | B1 | 7/2021 |
| TW | 258090 | U | 9/1995 |
| TW | M286123 | U | 1/2006 |

* cited by examiner

*Primary Examiner* — Leslie J Evanisko
(74) *Attorney, Agent, or Firm* — Hershkovitz & Associates, PLLC; Abe Hershkovitz

(57) ABSTRACT

A stamp handle mounted on a stamp seat of a stamp comprises a handle main body and a transparent housing. The handle main body comprises a top board portion and an exterior wall extending downwardly from the top board portion. The transparent housing comprises a top cover wall and an annular cover wall extending downwardly from the top cover wall, so is unlikely to deform. The transparent housing is detachably mounted outside of the handle main body. The top board portion and the exterior wall are revealed through the transparent housing, thereby enlarging an area for setting figures, improving variabilities of the stamp. The transparent housing is unlikely to deform. The transparent housing is mounted on the handle main body through at least one engaging portion and clamping portion, thereby securely mounted on the handle main body to protect the figure on the handle main body.

19 Claims, 11 Drawing Sheets

STAMP HANDLE HAVING TRANSPARENT HOUSING

BACKGROUND OF THE INVENTION

1. Field of the Invention

The present invention relates to a stamp, especially to a stamp handle in the stamp that facilitates holding by hands to stamp.

2. Description of Related Art

A stamp is a common stationary tool for daily transaction of business. To facilitate a user to continuously perform the act of stamping, by mechanical designs, a conventional stamp has a patterned surface with specific patterns or dates that can be automatically dipped with ink and stamped.

In a composite of the conventional stamp, to facilitate the user to hold the stamp and do the stamping, a stamp handle is mounted on a stamp seat of the conventional stamp and a transparent plate is mounted on top of the stamp handle. A figure corresponding to the patterns of the patterned surface is mounted on top of the stamp handle and is covered by the transparent plate to be protected while the figure can still be revealed.

In the conventional stamp, the stamp handle has a figure-installed portion on top of it for the figure to be mounted thereon, and the transparent plate protects the figure and the figure-installed portion. However, an area of the figure-installed portion is rather small; hence, it is difficult to variate the figure. Because the stamp handle is limited in functional needs, the stamp handle is monotonous and is hard to be customized according to different consumers' needs, therefore lacking appeal to consumers.

Furthermore, the detachable transparent plate of the stamp handle is usually a flat board or a U-shaped board arched at front and rear sides, so the transparent plate is only attached to the top of the stamp handle by its lateral-side protrusions. Therefore, when applied force, the transparent plate is prone to be bent and deformed, which makes the transparent plate easy to be detached and so cannot provide proper protection.

SUMMARY OF THE INVENTION

The main objective of the present invention is to provide a stamp handle to resolve drawbacks that a conventional stamp handle has a monotonous appearance and is hard to be customized because of functional needs, therefore lacking appeal to consumers, and to resolve a technical downside that a transparent plate falls off easily from the stamp handle.

The stamp handle is configured to be mounted on a stamp seat of a stamp and comprises a handle main body and a transparent housing. The handle main body comprises a top board portion and an exterior wall, which extends downwardly from a periphery of the top board portion and has at least one clamping portion mounted on at least one side of the exterior wall. The transparent housing is mounted at the handle main body and comprises a top cover wall, an annular cover wall and an assembling chamber. The annular cover wall extends downwardly from the top cover wall, surrounds the exterior wall of the handle main body, and has at least one engaging portion mounted on at least one side of the annular cover wall. The assembling chamber is disposed between the top cover wall and the annular cover wall and has an opening facing downwardly. An inner contour of the assembling chamber corresponds in shape to an exterior contour of the handle main body. The at least one engaging portion and the at least one clamping portion correspond to each other and can be engaged with or detached from each other, such that the transparent housing mounted outside of the handle main body can be connected to or detached from the handle main body. The top board portion and the exterior wall of the handle main body are revealed to an external environment through the transparent housing when the transparent cover is connected to the handle main body.

The stamp handle mounted on the stamp has the following functions:

1. Enlarging an area for setting a figure of the stamp handle to increase varieties of the stamp: By the transparent housing shielding the top board portion and the exterior wall of the handle main body, an area shielded by the transparent housing is rather large, thereby enlarging an area for setting a FIG. of the stamp handle. Not only the top board portion, but also the exterior wall of the handle main body can be set with a figure. So, a user can customize their own figures on the handle main body. Because the user has a larger area to create their own designs, the stamp has more varieties, and a large-area FIG. makes the stamp have visually-obvious identification effects.

2. Providing great protection to the figure: As abovementioned, the transparent housing shields the top board portion and the exterior wall of the handle main body with a large area. By protruding the annular cover wall from the top cover wall, the shape of the transparent housing makes the transparent housing unlikely to deform. Further, the shape of the transparent housing enables the transparent housing to cover outside of the exterior wall of the handle main body and to be securely mounted on the handle main body by the at least one engaging portion and the at least one clamping portion engaging with each other. Therefore, the transparent housing provides great protection to the figure set on the handle main body.

DETAILED DESCRIPTION OF THE PREFERRED EMBODIMENT

With reference to FIGS. 1 to 3, 5, and 7 to 11, multiple embodiments of a stamp handle 20 in accordance with the present invention are shown. The stamp handle 20 is configured to be mounted at a stamp 1. The stamp 1 comprises a stamp seat 10 and a stamping mechanism 11 mounted in the stamp seat 10. The stamp handle 20 is mounted on the stamp seat 10.

Figure 1:
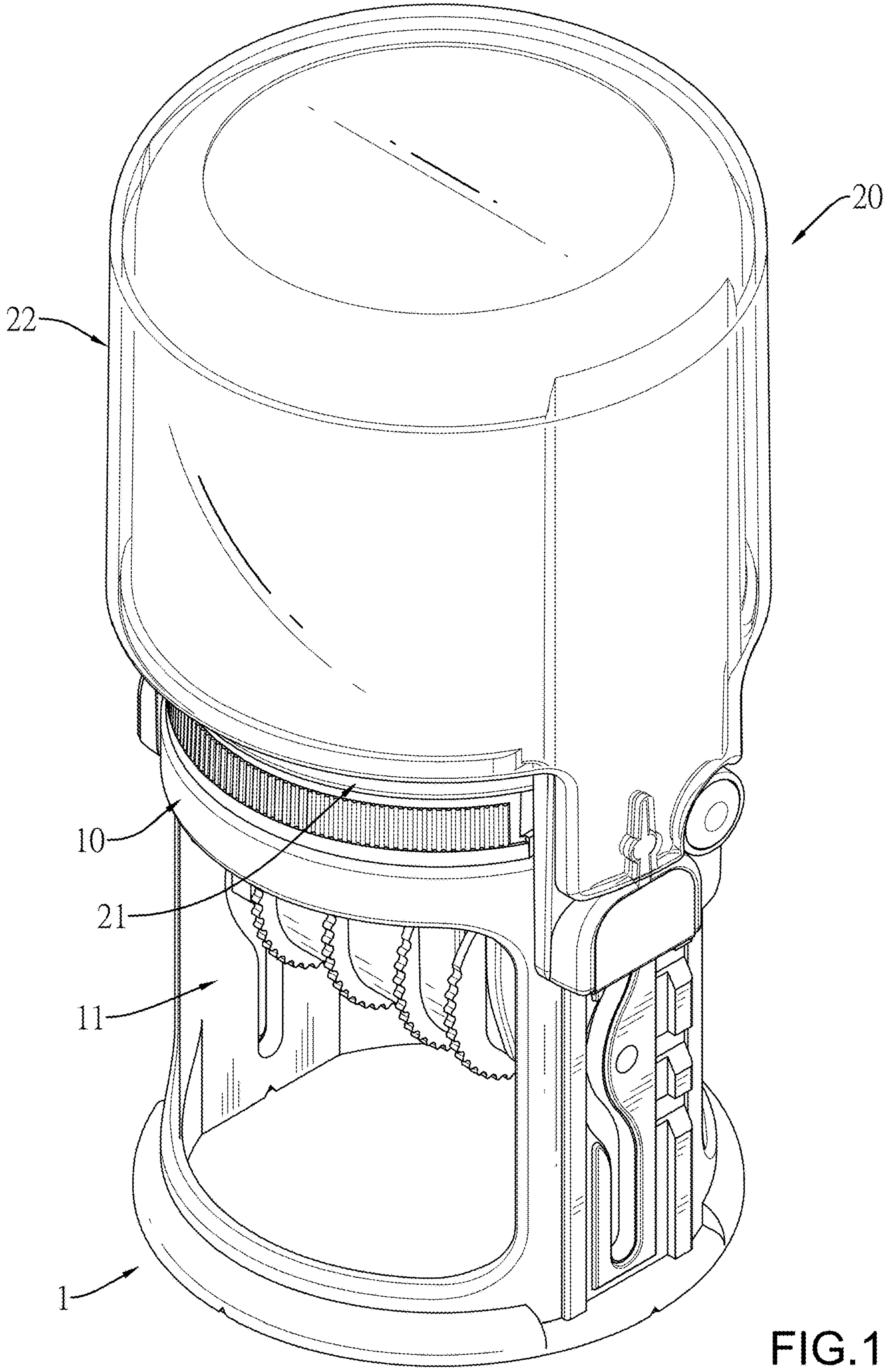
FIG. 1 is a perspective view of a first embodiment of a stamp handle in accordance with the present invention, applied in a stamp.
Figure 2:
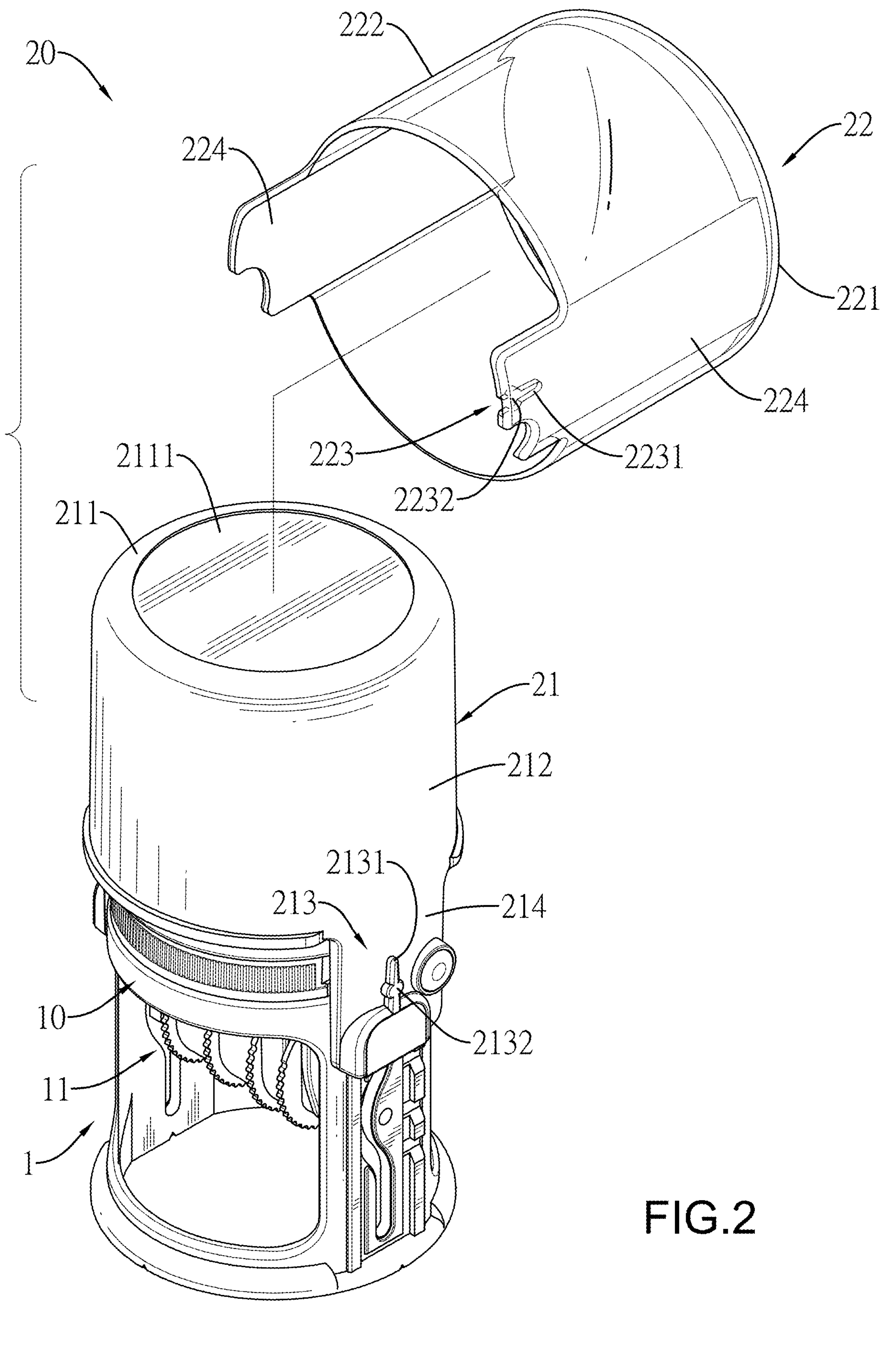
FIG. 2 is an exploded view of the first embodiment of the stamp handle in accordance with the present invention, applied in the stamp.
Figure 3:
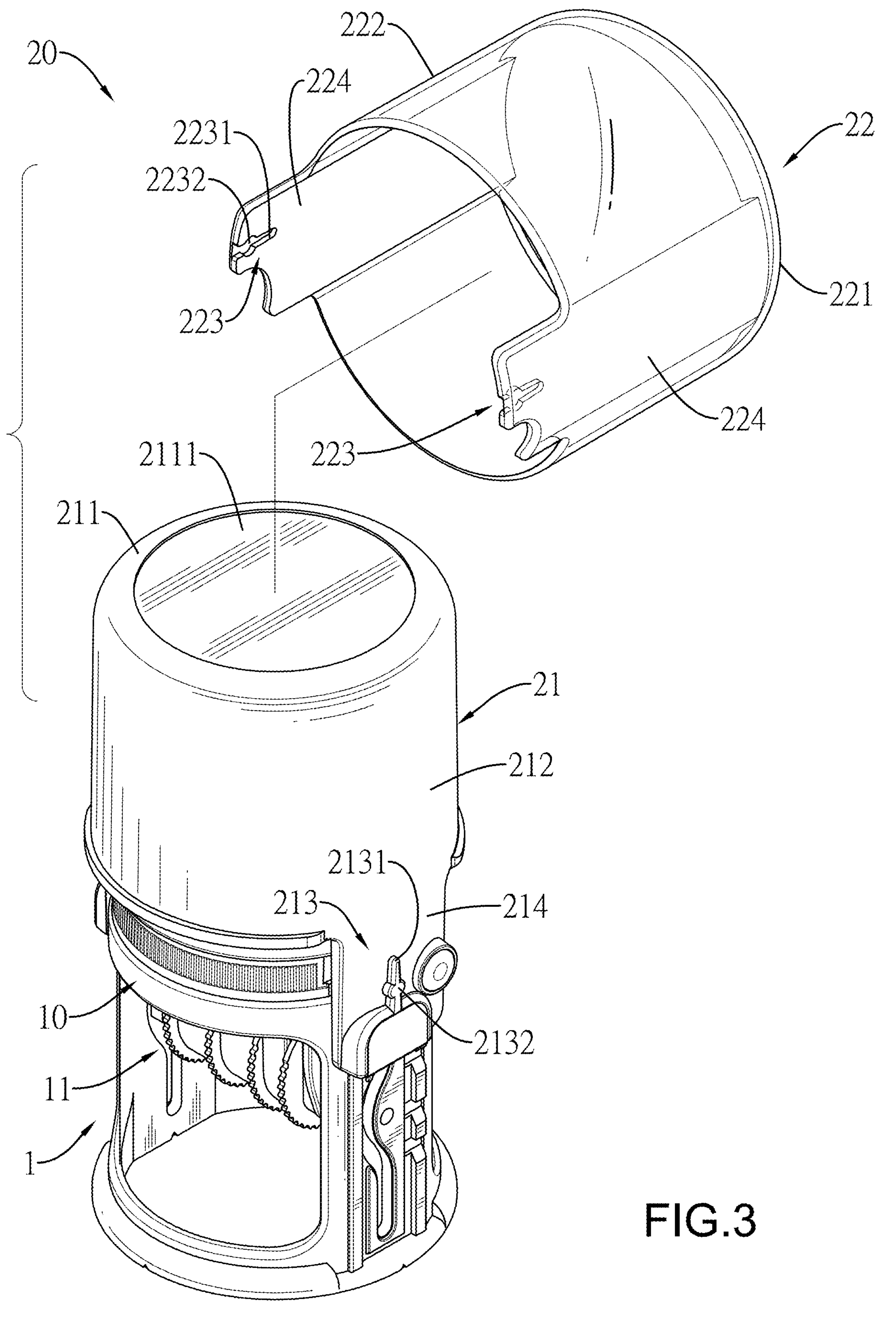
FIG. 3 is a perspective view of a second embodiment of the stamp handle in accordance with the present invention, applied in the stamp.
Figure 4:
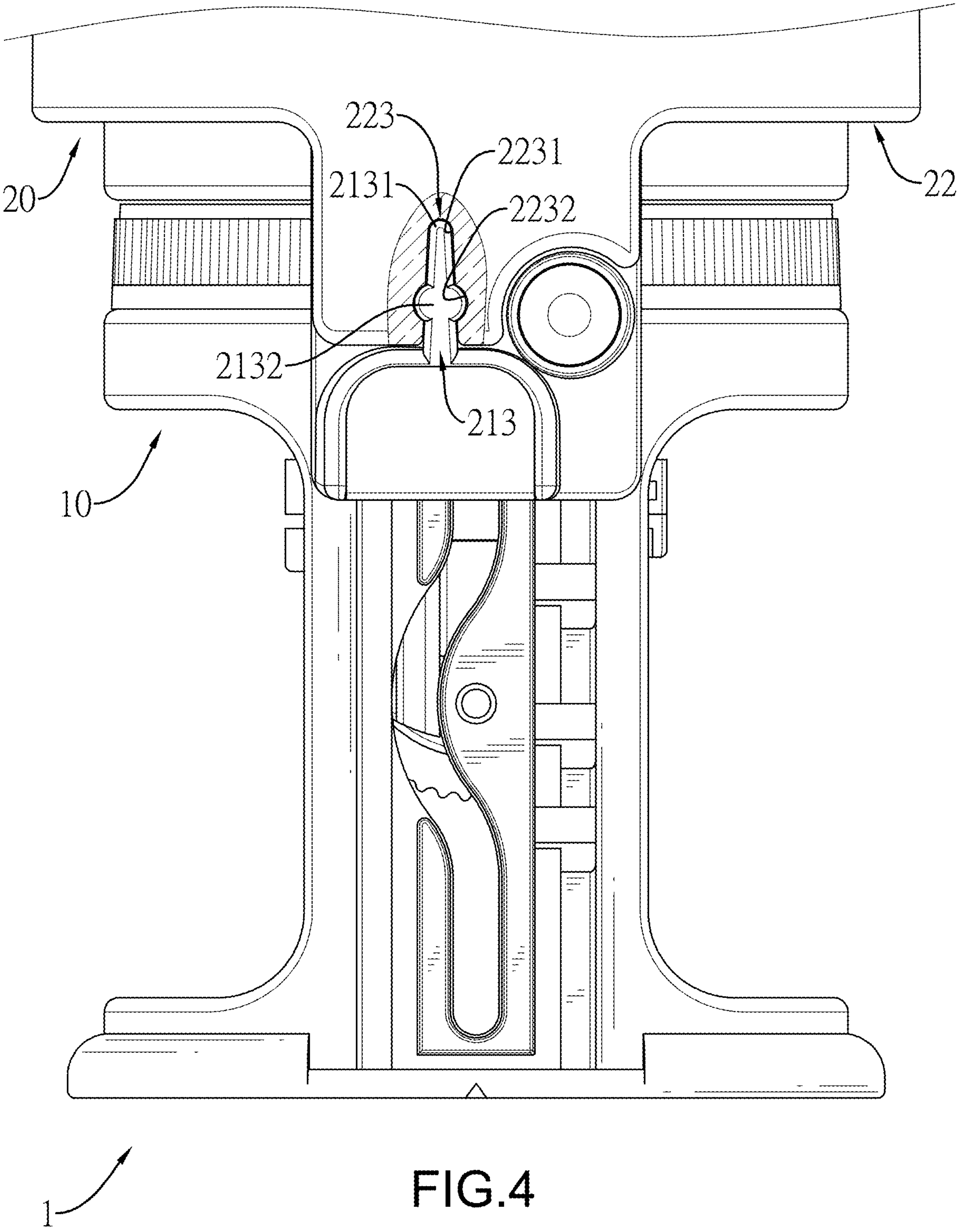
FIG. 4 is a partially sectional view of the first and second embodiments of the stamp handle in accordance with the present invention, applied in the stamp.

With reference to FIGS. 1 to 3, 5, and 7 to 11, the stamp handle 20 comprises a handle main body 21 and a transparent housing 22. The handle main body 21 comprises a top board portion 211 and an exterior wall 212 extending downwardly from a periphery of the top board portion 211. The exterior wall 212 has at least one clamping portion 213. As shown in FIGS. 1 and 2, the amount of the at least one clamping portion 213 is one, and the clamping portion 213 is mounted at a side of the exterior wall 212.

Alternatively, as shown in FIGS. 3, 8, 9 and 10, the amount of the at least one clamping portion 213 is two, and the two clamping portions 213 are respectively mounted at two opposite sides of the exterior wall 212. A pattern-placement recess 2111 is disposed in the top board portion 211 to provide a place to set a figure with patterns. The transparent housing 22 comprises a top cover wall 221 and an annular cover wall 222 extending downwardly from the top cover wall 221 and surrounding the exterior wall 212 of the handle main body 21. An assembling chamber is disposed between the top cover wall 221 and the annular cover wall 222, and has an opening facing downwardly. An inner contour of the assembling chamber corresponds in shape to an exterior contour of the handle main body 21. The annular cover wall 222 has at least one engaging portion 223. As shown in FIGS. 1 and 2, the amount of the at least one engaging portion 223 is one, and the engaging portion 223 is mounted at a side of the annular cover wall 222. Alternatively, as shown in FIGS. 3, 8, 9 and 10, the amount of the at least one engaging portion 223 is two, and the two engaging portions 223 are respectively mounted at two opposite sides of the annular cover wall 222. The at least one engaging portion 223 and the at least one clamping portion 213 correspond to each other and can be engaged with or detached from each other. So, the transparent housing 22 mounted outside of the handle main body 21 can be connected to the handle main body 21 through the at least one engaging portion 223 and the at least one clamping portion 213, or be detached from the handle main body 21. The top board portion 211 and the exterior wall 212 of the handle main body 21 are revealed to an external environment through the transparent housing 22.

With reference to FIGS. 1 to 3, 5, and 7 to 11, the at least one engaging portion 223 and the at least one clamping portion 213 are in a concave-convex complementary manner. In embodiments shown in the abovementioned figures, the at least one engaging portion 223 of the transparent housing 22 is a recess formed at an inner surface of the annular cover wall 222 and is elongated upwardly from a bottom edge of the annular cover wall 222. The at least one engaging portion 223 can further extend to an outside surface of the annular cover wall 222. The at least one clamping portion 213 of the handle main body is a protrusion protruding from an outer surface of the exterior wall 212 and cooperates with the at least one engaging portion 223.

With reference to FIGS. 2 to 5, 8, 10 and 11, each one of the at least one clamping portion 213 comprises a vertical protrusion 2131 and two arched protrusions 2132 respectively disposed at two opposite sides of the vertical protrusion 2131. The protrusions of the at least one clamping portion 213 are formed at an outer surface of the exterior wall 212. Each of the at least one engaging portion 223 comprises a vertical recess 2231 and two arched dents 2232 respectively located at two opposite sides of the vertical recess 2231. The vertical recess 2231 corresponds to the vertical protrusion 2131. The two arched dents 2232 respectively correspond to the two arched protrusions 2132.

Figure 5:
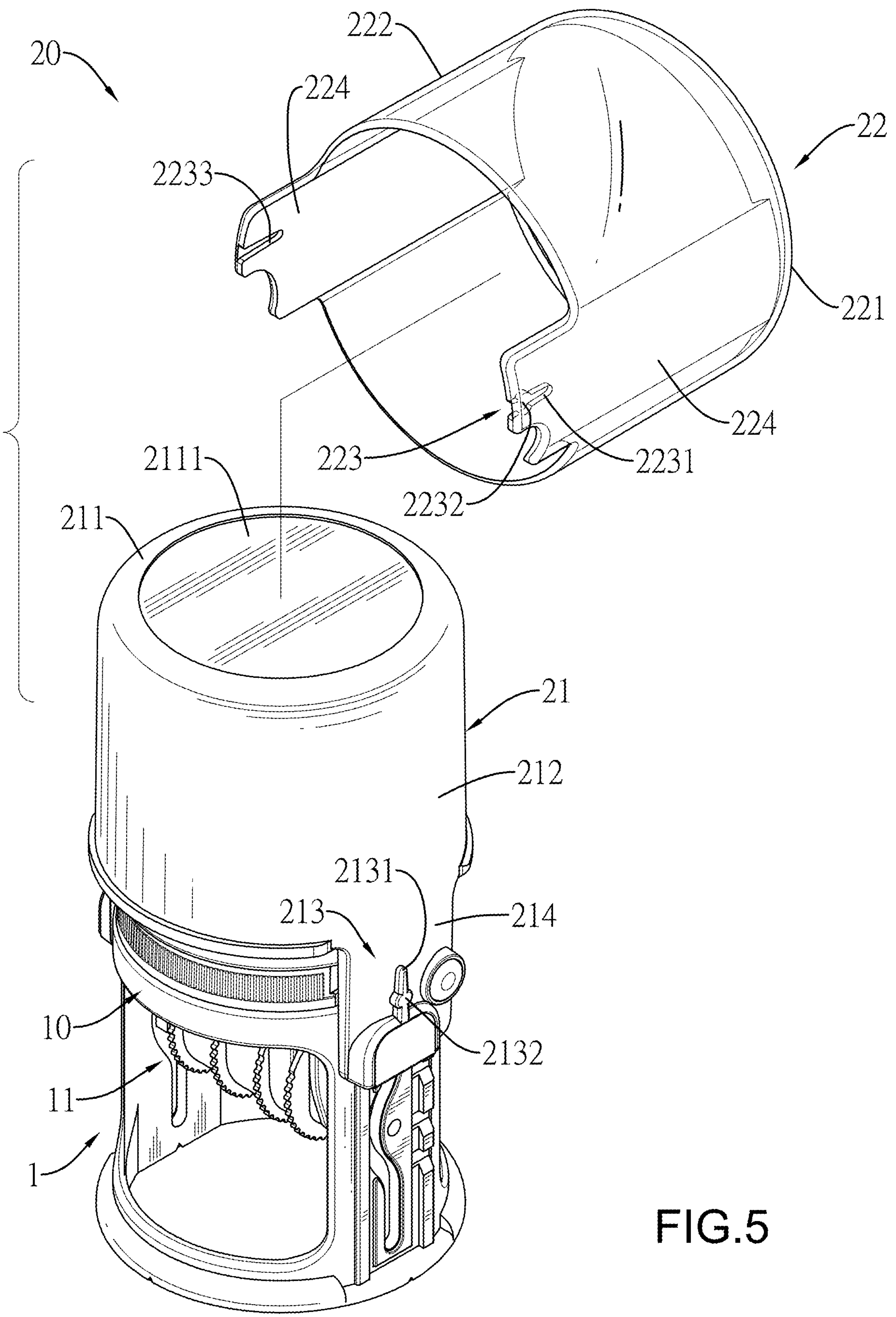
FIG. 5 is a perspective view of a third embodiment of the stamp handle in accordance with the present invention, applied in the stamp.
Figure 6:
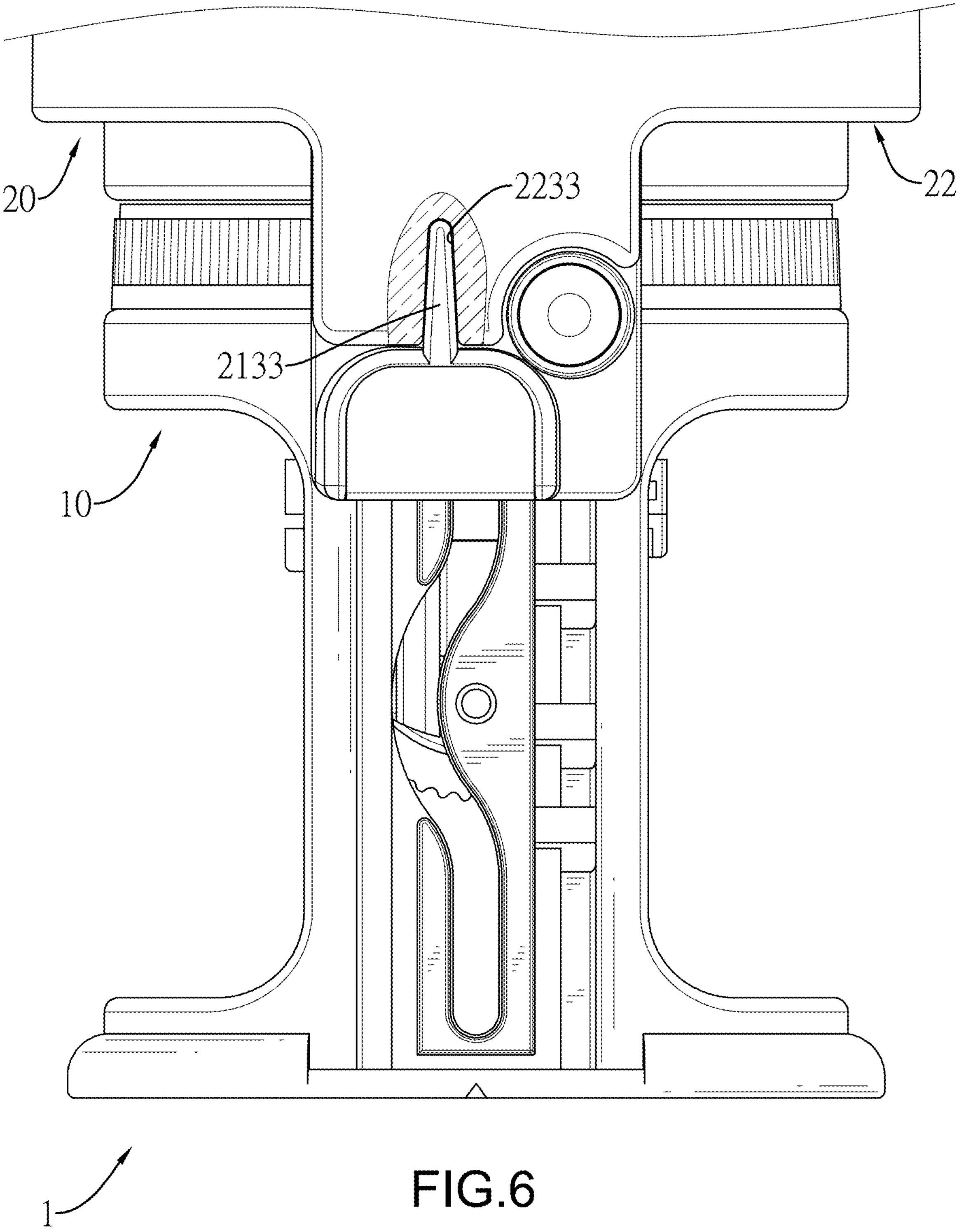
FIG. 6 is a partially sectional view of the third embodiment of the stamp handle in accordance with the present invention, shown in FIG. and applied in the stamp.
Figure 11:
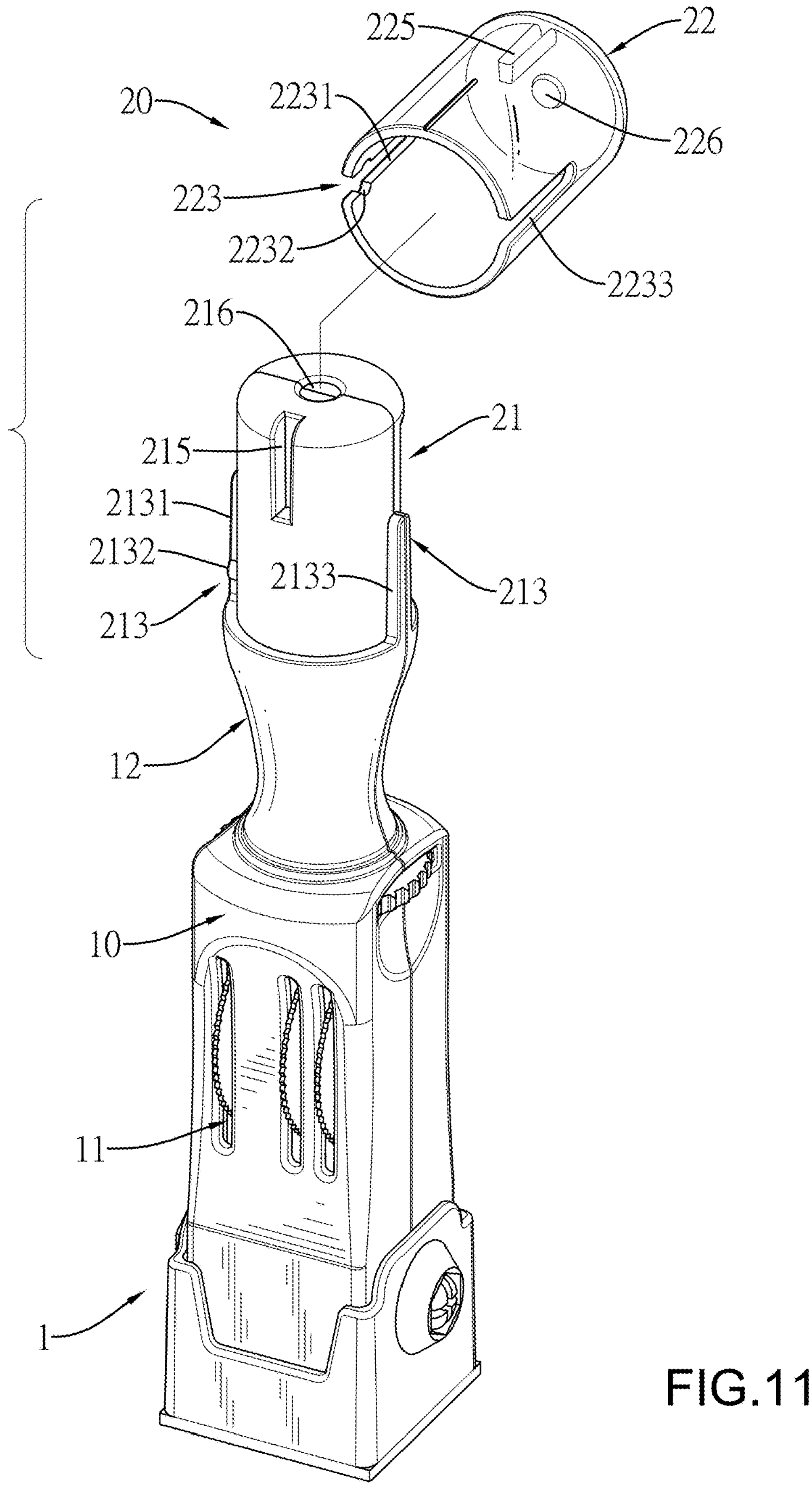
FIG. 11 is an exploded view of another embodiment of the stamp handle, applied in the stamp.

In another embodiment of the stamp handle 20 as shown in FIGS. 5, 6 and 11, one clamping portion 213 is disposed at one of the two opposite sides of the exterior wall 212 of the handle main body 21. A vertical linear bar 2133 is mounted at the other one of the two opposite sides of the exterior wall 212 of the handle main body 21. One engaging portion 223, which can be engaged with the clamping portion 213, is disposed at one of the two opposite sides of the annular cover wall 222 of the transparent housing 22. A vertical linear groove 2233 is located at the other one of the two opposite sides of the annular cover wall 222 of the transparent housing 22. The vertical linear groove 2233 and the vertical linear bar 2133 correspond to each other and can be engaged with each other.

In an embodiment of the stamp 1 shown in FIGS. 1 to 6, the stamp 1 is a date stamp. The stamp handle 20 is up-and-down-movably mounted on the stamp seat 10 and is connected to the stamping mechanism 11 in the stamp seat 10. The stamp handle 20 can be used to operate the stamping mechanism 11 to stamp. The stamp 1 is cylindrical and the stamp handle 20 is cylindrical. The handle main body 21 comprises two connecting sections 214 respectively extending downwardly from the two opposite sides of the exterior wall 212 of the handle main body 21 and connects the stamping mechanism 11 through the two connecting sections 214. The transparent housing 22 comprises two extending portions 224 respectively extending downwardly from the two opposite sides of the annular cover wall 222 of the transparent housing 22. The two extending portions 224 are respectively disposed outside of the two connecting sections 214. The at least one clamping portion 213 is mounted at one of the two connecting sections 214. The at least one engaging portion 223 is mounted at one of the two extending portions 224. The two connecting sections 214 and the two extending portions 224 are engaged with and connected to each other through the at least one clamping portion 213 and the at least one engaging portion 223.

Figure 7:
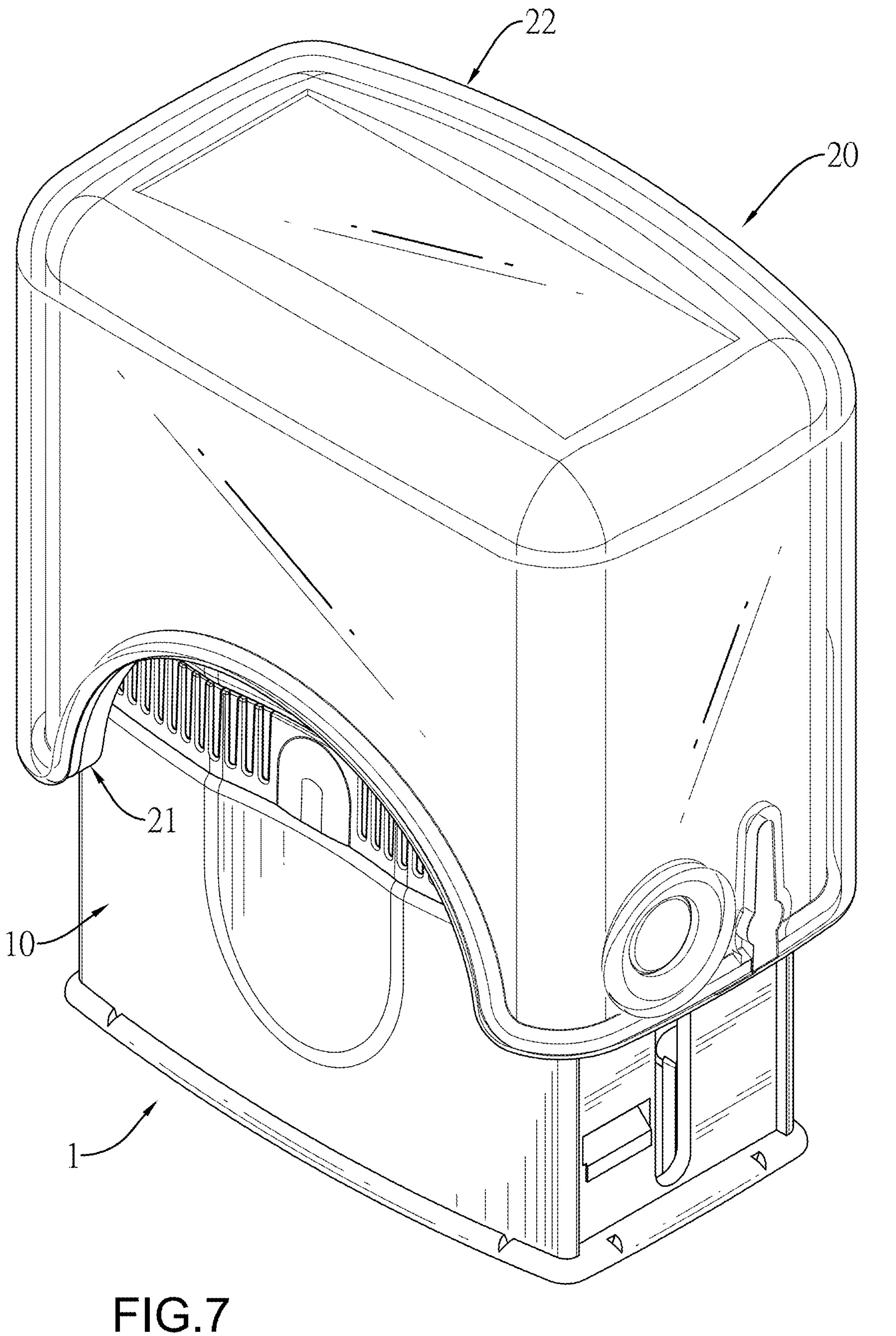
FIG. 7 is a perspective view of the stamp handle in accordance with the present invention, applied in another embodiment of the stamp.
Figure 8:
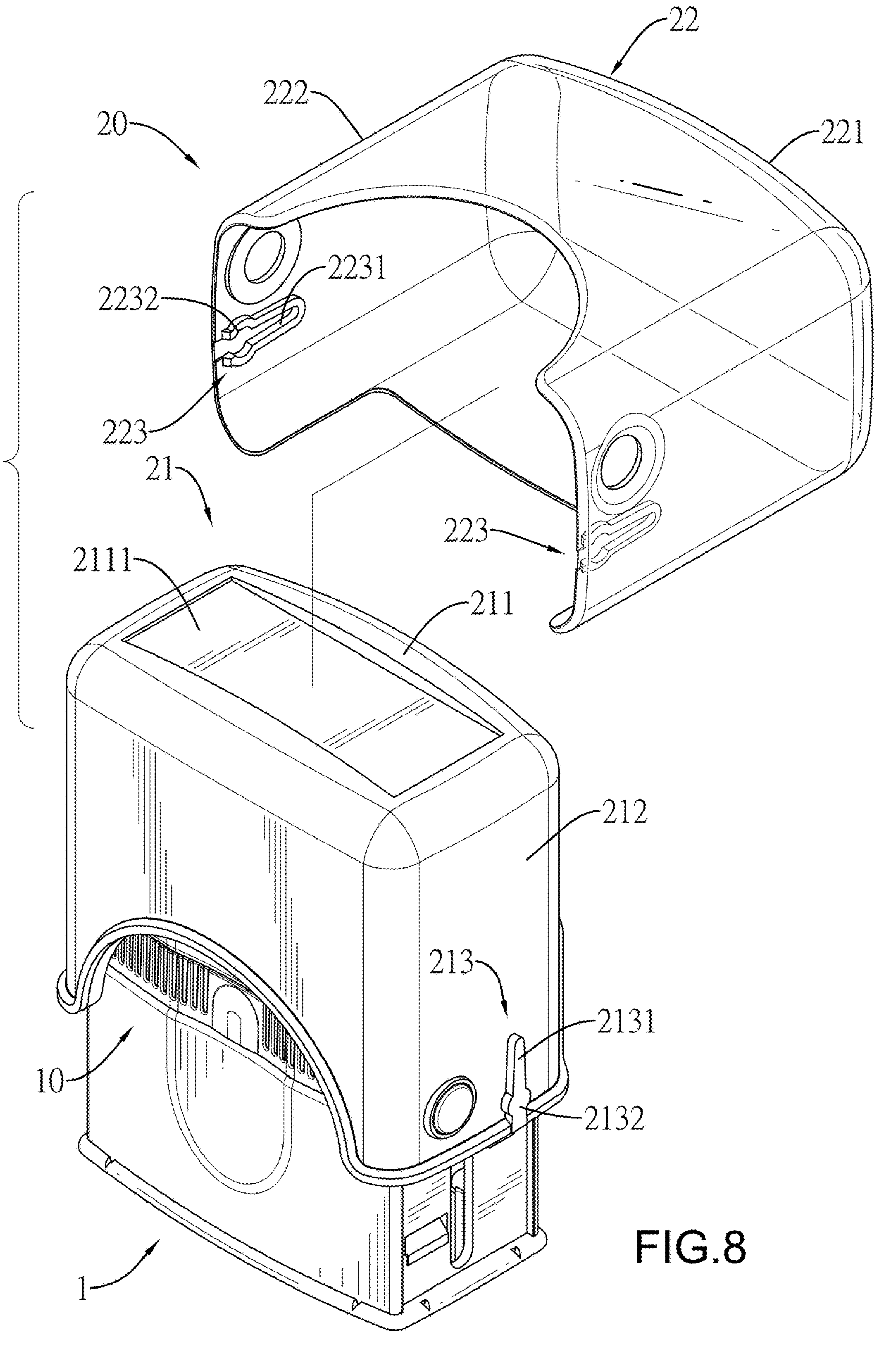
FIG. 8 is an exploded view of the stamp handle, applied in the embodiment of the stamp shown in FIG. 7.

In an embodiment of the stamp 1 shown in FIGS. 7 and 8, the stamp 1 is a continuous stamp that can stamp continuously. The stamp handle 20 is up-and-down-movably mounted on the stamp seat 10 and is connected to the stamping mechanism 11 in the stamp seat 10. The stamp handle 20 can be used to operate the stamping mechanism 11 to stamp. The stamp 1 is cuboid. The stamp handle 20 is cuboid.

Figure 9:
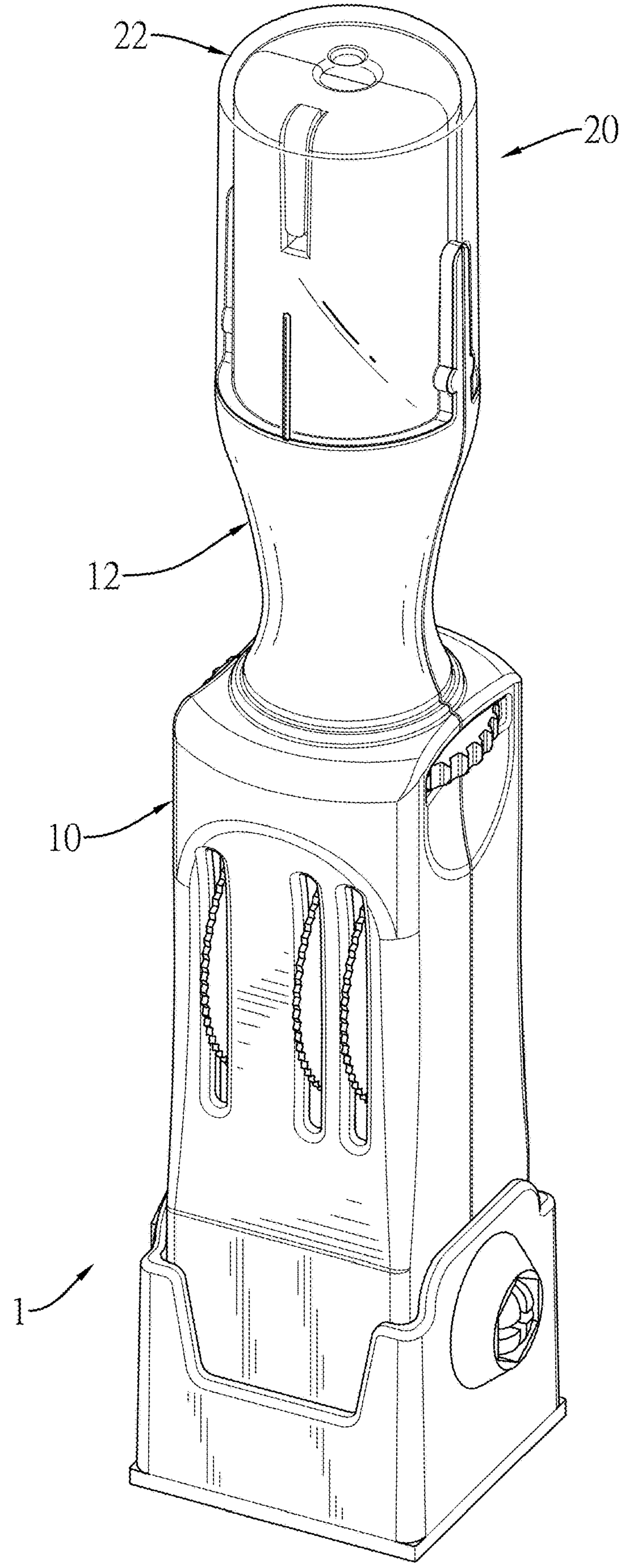
FIG. 9 is a perspective view of the stamp handle in accordance with the present invention, applied in another embodiment of the stamp.
Figure 10:
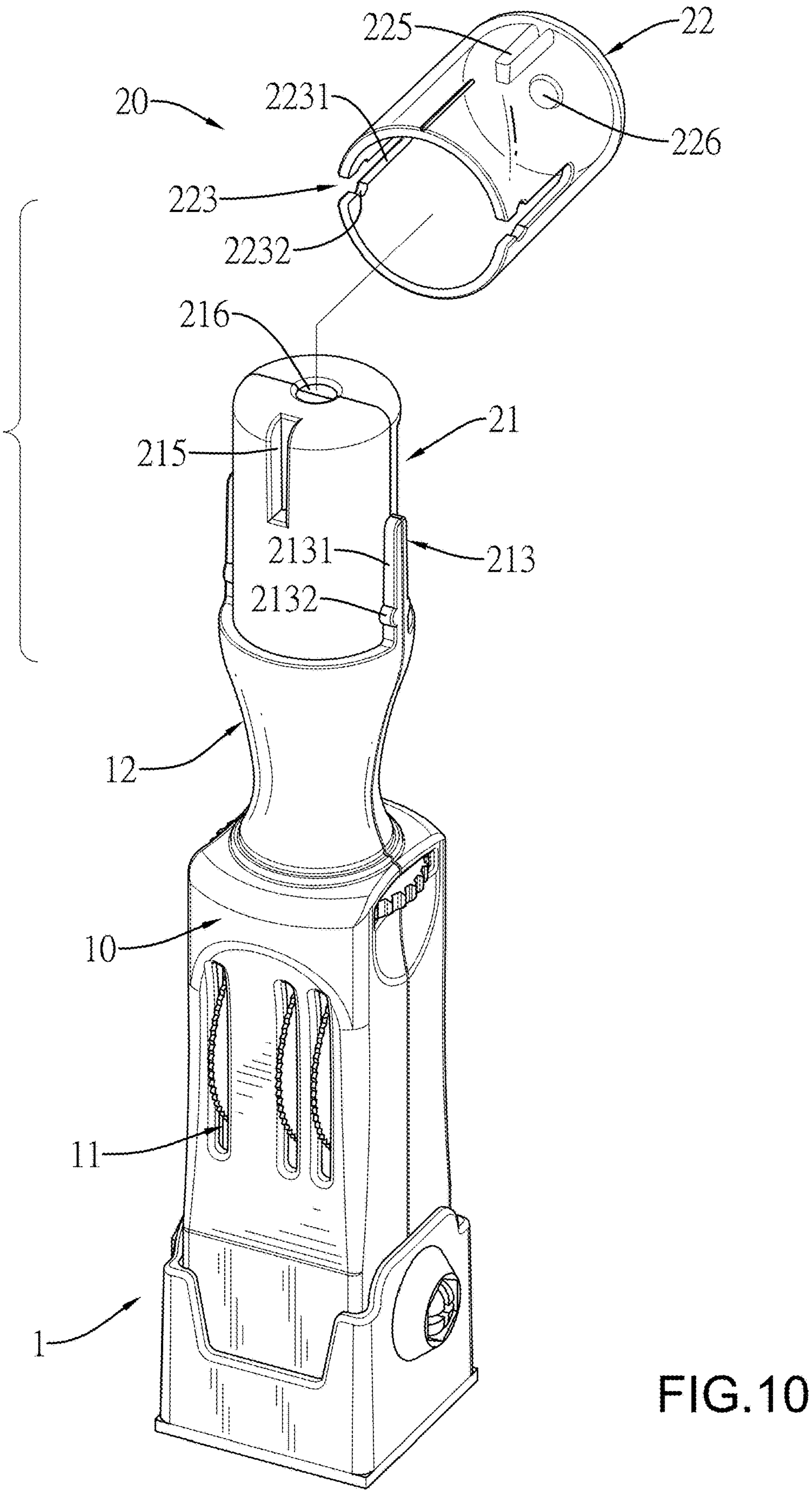
FIG. 10 is an exploded view of the stamp handle, applied in the embodiment of the stamp shown in FIG. 9.

In an embodiment of the stamp 1 shown in FIGS. 9 to 11, the stamp 1 is another type of date stamp. The stamp 1 has an operating rod 12 mounted at a top portion of the stamp seat 10. The handle main body 21 of the stamp handle 20 is mounted on an upper section of the operating rod 12. The transparent housing 22 is mounted around and outside of the handle main body 21, and is disposed at the upper section of the operating rod 12. In this embodiment, the handle main body 21 comprises a positioning recess 215 elongated downwardly from a side of the top board portion 211 of the handle main body 21. The transparent housing 22 comprises a positioning protrusion 225 elongated downwardly from a side of the top cover wall 221 of the transparent housing 22. The positioning protrusion 225 is engaged with the positioning recess 215 to assist with positioning and engagement of the at least one engaging portion 223 and the at least one clamping portion 213, thereby increasing assembling stability between the handle main body 21 and the transparent housing 22.

In the embodiment shown in FIGS. 10 and 11, the top board portion 211 of the handle main body 21 comprises a central recess 216 formed at a center of the top board portion 211. The top cover wall 221 of the transparent housing 22 comprises a central protrusion 226 formed at an inner-side center of the top cover wall 221, corresponding in position to the central recess 216, and can extend into the central recess 216. The central protrusion 226 and the central recess 216 cooperate with each other for positioning, thereby assisting with the assembling stability between the handle main body 21 and the transparent housing 22.

As mentioned above, the stamp handle 20 is configured to be used in the stamp 1. Other than provided for a user to hold and stamp, the stamp handle 20 has a large area for setting a figure because the transparent housing 22 covers a large area of the top board portion 211 and the exterior wall 212 of the handle main body 21. So, the user can customize their own figures on the handle main body 21 and create their own designs. Besides, a large-area figure makes the stamp 1 have visually-obvious identification effects. Furthermore, because the transparent housing 22 is bell-shaped, it is unlikely to deform. The transparent housing 22 is mounted and covers outside of the handle main body by the at least one engaging portion 223 and the at least one clamping portion 213 engaging with each other. Therefore, the transparent housing 22 is securely mounted on the handle main body 21 and hence provides great protection to the figure set on the handle main body 21.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A stamp handle configured to be mounted on a stamp seat of a stamp and the stamp handle comprising a handle main body mounted on the stamp seat and comprising a top board portion;

an exterior wall extending downwardly from a periphery of the top board portion and having at least one clamping portion mounted on at least one side of the exterior wall;

a transparent housing mounted at the handle main body and comprising a top cover wall;

an annular cover wall extending downwardly from the top cover wall, surrounding the exterior wall of the handle main body, and having at least one engaging portion mounted on at least one side of the annular cover wall;

an assembling chamber disposed between the top cover wall and the annular cover wall and having an opening facing downwardly; an inner contour of the assembling chamber corresponding in shape to an exterior contour of the handle main body;

wherein the at least one engaging portion and the at least one clamping portion correspond to each other and are capable of engaging with or detaching from each other, such that the transparent housing mounted outside of the handle main body is connectable to or detachable from the handle main body; the top board portion and the exterior wall of the handle main body are revealed to an external environment through the transparent housing when the transparent cover is connected to the handle main body;

wherein the at least one engaging portion of the transparent housing is a recess formed at an inner surface of the annular cover wall, and is elongated upwardly from a bottom edge of the annular cover wall; and the at least one clamping portion of the handle main body is a protrusion protruding from an outer surface of the exterior wall and cooperates with the at least one engaging portion.

2. The stamp handle as claimed in claim 1, wherein the at least one clamping portion comprises two, and the two clamping portions are respectively disposed at two opposite sides of the exterior wall of the handle main body;

the at least one engaging portion comprises two, and the two engaging portions are respectively disposed at two opposite sides of the annular cover wall of the transparent housing, and respectively correspond to the two clamping portions;

each one of the two clamping portions comprises a vertical protrusion; and two arched protrusions respectively disposed at two opposite sides of the vertical protrusion;

each one of the two engaging portions comprises a vertical recess corresponding to the vertical protrusion; and two arched dents respectively disposed at two opposite sides of the vertical recess and respectively corresponding to the two arched protrusions of the corresponding clamping portion.

3. The stamp handle as claimed in claim 2, wherein the stamp handle is cylindrical;

the handle main body comprises two connecting sections respectively extending downwardly from the two opposite sides of the exterior wall of the handle main body;

the transparent housing comprises two extending portions respectively extending downwardly from the two opposite sides of the annular cover wall of the transparent housing;

the two extending portions are respectively disposed outside of the two connecting sections;

the two clamping portions are respectively mounted at the two connecting sections;

the two engaging portions are respectively mounted at the two extending portions;

the two connecting sections and the two extending portions are connected with each other through the two clamping portions and the two engaging portions engaged with each other.

4. The stamp handle as claimed in claim 1, wherein
the at least one clamping portion comprises one, and the clamping portion and a vertical linear bar are disposed at two opposite sides of the exterior wall of the handle main body;
the at least one engaging portion comprises one, and the engaging portion and a vertical linear groove are disposed at two opposite sides of the annular cover wall of the transparent housing;
the vertical linear groove corresponds to and is able to be engaged with the vertical linear bar;
the clamping portion comprises
a vertical protrusion; and
two arched protrusions respectively disposed at two opposite sides of the vertical protrusion;
the engaging portion comprises
a vertical recess corresponding to the vertical protrusion; and
two arched dents respectively disposed at two opposite sides of the vertical recess and respectively corresponding to the two arched protrusions.

5. The stamp handle as claimed in claim 4, wherein
the stamp handle is cylindrical;
the handle main body comprises
two connecting sections respectively extending downwardly from the two opposite sides of the exterior wall of the handle main body;
the transparent housing comprises
two extending portions respectively extending downwardly from the two opposite sides of the annular cover wall of the transparent housing;
the two extending portions are respectively disposed outside of the two connecting sections;
the clamping portion and the vertical linear bar are respectively mounted at the two connecting sections, and the engaging portion and the vertical linear groove are respectively located at the two extending portions, such that the two connecting sections and the two extending portions are engaged with each other.

6. The stamp handle as claimed in claim 5, wherein the stamp handle is cuboid.

7. The stamp handle as claimed in claim 6, wherein
the stamp has
an operating rod mounted at a top portion of the stamp seat;
the handle main body of the stamp handle is mounted on an upper section of the operating rod;
the transparent housing is mounted around the handle main body and is disposed at the upper section of the operating rod;
the handle main body comprises
a positioning recess elongated downwardly from a side of the top board portion of the handle main body;
the transparent housing comprises
a positioning protrusion elongated downwardly from a side of the top cover wall of the transparent housing and engaged with the positioning recess.

8. The stamp handle as claimed in claim 6, wherein
the top board portion of the handle main body comprises
a central recess formed at a center of the top board portion;
the top cover wall of the transparent housing comprises
a central protrusion formed at an inner-side center of the top cover wall and corresponding in position to the central recess.

9. The stamp handle as claimed in claim 8, wherein the top board portion comprises a pattern-placement recess.

10. The stamp handle as claimed in claim 4, wherein the stamp handle is cuboid.

11. The stamp handle as claimed in claim 10, wherein
the stamp has
an operating rod mounted at a top portion of the stamp seat;
the handle main body of the stamp handle is mounted on an upper section of the operating rod;
the transparent housing is mounted around the handle main body and is disposed at the upper section of the operating rod;
the handle main body comprises
a positioning recess elongated downwardly from a side of the top board portion of the handle main body;
the transparent housing comprises
a positioning protrusion elongated downwardly from a side of the top cover wall of the transparent housing and engaged with the positioning recess.

12. The stamp handle as claimed in claim 11, wherein
the top board portion of the handle main body comprises
a central recess formed at a center of the top board portion;
the top cover wall of the transparent housing comprises
a central protrusion formed at an inner-side center of the top cover wall and corresponding in position to the central recess.

13. The stamp handle as claimed in claim 12, wherein the top board portion comprises a pattern-placement recess.

14. The stamp handle as claimed in claim 1, wherein
the stamp handle is cylindrical;
the handle main body comprises
two connecting sections respectively extending downwardly from two opposite sides of the exterior wall of the handle main body;
the transparent housing comprises
two extending portions respectively extending downwardly from two opposite sides of the annular cover wall of the transparent housing;
the two extending portions are respectively disposed outside of the two connecting sections;
the at least one clamping portion is mounted at the two connecting sections;
the at least one engaging portion is mounted at the two extending portions;
the two connecting sections and the two extending portions are connected with each other through the at least one clamping portion and the at least one engaging portion engaged with each other.

15. The stamp handle as claimed in claim 1, wherein the stamp handle is cuboid.

16. The stamp handle as claimed in claim 1, wherein
the stamp has
an operating rod mounted at a top portion of the stamp seat;
the handle main body of the stamp handle is mounted on an upper section of the operating rod;
the transparent housing is mounted around the handle main body and is disposed at the upper section of the operating rod;
the handle main body comprises
a positioning recess elongated downwardly from a side of the top board portion of the handle main body;
the transparent housing comprises
a positioning protrusion elongated downwardly from a side of the top cover wall of the transparent housing and engaged with the positioning recess.

17. The stamp handle as claimed in claim 16, wherein the top board portion of the handle main body comprises a central recess formed at a center of the top board portion;

the top cover wall of the transparent housing comprises a central protrusion formed at an inner-side center of the top cover wall and corresponding in position to the central recess.

18. The stamp handle as claimed in claim 17, wherein the top board portion comprises a pattern-placement recess.

19. The stamp handle as claimed in claim 1, wherein the top board portion comprises a pattern-placement recess.

* * * * *